United States Patent [19]

Halasz

[11] 4,426,031

[45] Jan. 17, 1984

[54] METHOD OF SOLDERING INK JET NOZZLE TO PIEZOELECTRIC ELEMENT

[75] Inventor: Laszlo Halasz, Cleveland, Ohio

[73] Assignee: Gould Inc., Rolling Meadows, Ill.

[21] Appl. No.: 296,093

[22] Filed: Aug. 26, 1981

Related U.S. Application Data

[60] Division of Ser. No. 91,210, Nov. 5, 1979, Pat. No. 4,308,546, which is a continuation of Ser. No. 886,882, Mar. 15, 1978, abandoned.

[51] Int. Cl.$^3$ .................... B23K 1/02; G01N 15/00; G01M 3/20

[52] U.S. Cl. .................................. 228/121; 73/104; 228/124; 228/254; 228/226

[58] Field of Search .............. 228/121, 124, 254, 132, 228/226; 73/104

[56] References Cited

U.S. PATENT DOCUMENTS 3,633,266 1/1972 Taylor .......................... 228/132 X
3,995,483 12/1976 Hartong et al. ...................... 73/104

OTHER PUBLICATIONS

*Metals Handbook*, vol. 1; American Society for Metals, 8th Edition, 1961, pp. 863-864.
Cerro Alloys as Low Temperature Solders; Cerro Copper and Brass Co., Stamford, Conn.
Glass to Glass and Glass to Metal Joints; Cerro Copper and Brass Co., Stamford, Conn.

*Primary Examiner*—Kenneth J. Ramsey
*Attorney, Agent, or Firm*—John R. Garrett

[57] ABSTRACT

An ink jet tip assembly in which the individual jets are comprised of a piezoelectric cylinder having a longitudinally through bore, a glass ink nozzle disposed in the cylinder bore and a low melting temperature alloy interposed between the bore and the nozzle for anchoring the nozzle to the piezoelectric cylinder. The method of assembly for the individual jet tip assemblies comprises inserting the glass ink nozzle into the cylinder bore which contains the anchoring alloy in a molten form. A method of checking for flaws in the cylinder comprises fluxing the cylinder bore for allowing flux to pass through any cylinder pinholes or cracks. Upon introducing solder for coating the interior cylinder wall, some solder will appear as shining spots or areas on the cylinder exterior wall.

10 Claims, 5 Drawing Figures

METHOD OF SOLDERING INK JET NOZZLE TO PIEZOELECTRIC ELEMENT

CROSS REFERENCE TO RELATED APPLICATIONS

This application is a Division of Application U.S. Ser. No. 91,210 filed Nov. 5, 1979, U.S. Pat. No. 4,308,546, which application was a Continuation of Application U.S. Ser. No. 886,882 filed Mar. 15, 1978, now abandoned.

BACKGROUND OF THE INVENTION

This invention relates to the art of ink jet printing and more particularly to an improved ink jet tip assembly for ink jet printers and a method for manufacturing same.

Ink jet printers are known in the art as shown, for example, in U.S. Pat. Nos. 3,298,030 and 3,683,212. Ink jet printers are used in a wide variety of printing operations such as computer printout, business systems printers, or notation devices for intermittently operated recording charts. They are particularly useful in printing operations where high speed is required, where large numbers of or unusual characters are required, or where silent printing is desired. However, the manufacture of tip assemblies for these printers has heretofore been a time consuming and cumbersome operation with the tip assemblies thus produced having a relatively high instance of failure.

In these prior art ink jet printers, the tip assemblies have required a relatively high voltage to effect sufficient oscillation of a piezoelectric transducer element. In order to produce sufficient mechanical energy to achieve ejection of ink droplets over a long period of time in commercial applications, voltages on the order of 85 to 110 volts were required.

Relatively low oscillation frequencies of the prior art tip assemblies have undesirably retarded the printing speed for ink jet printers. The prior art tip assemblies normally were only capable of oscillation at frequencies on the order of a few kilohertz. Although the piezoelectric elements were capable of being oscillated at higher frequencies, the bonding together of the nozzle and piezoelectric element were not sufficiently consistent to facilitate efficient transfer of higher frequency vibrations from the piezoelectric element to the nozzle.

The glass ink nozzle in prior tip assemblies was normally anchored to the piezoelectric element with an electrically conductive, silver filled epoxy resin. This epoxy resin typically filled a small gap between the piezoelectric element and the glass nozzle. However, the gap was so small that the air required for the epoxy to cure was denied easy access. This caused the curing to take place slowly and irregularly over a long period of time. Also, as the epoxy cured, its characteristic, especially its vibratory energy transfer characteristics, changed and thereby caused the overall operating characteristics of the tip assemblies to change.

The irregular curing of epoxy further caused the required operating voltage and oscillating frequency to change with time. Those few tip assemblies which would operate at a low voltage or a high frequency one time could not be relied upon to operate at the same low voltage or high frequency during subsequent operations. There was a general tendency for epoxy bonded tip assemblies to require higher operating voltages and lower operating frequencies as they aged.

Further, epoxy adheres strongly to glass. In assembling the glass nozzle and the piezoelectric element, the nozzle outlet orifice tended to become plugged and because this orifice is very small, it was not readily cleanable. To alleviate these problems, special assembly techniques such as dipping the tip of the nozzle into wax were employed. This resulted in a two-step nozzle orifice cleaning process of first removing the epoxy from the wax and then removing the wax from the orifice.

Recently epoxy has been identified as a possible carcinogen. Thus, the prior assembly techniques noted above present safety hazards to workers closely involved therewith.

The present invention contemplates new and improved tip assembly arrangements and a method for making same which overcomes all of the above-referred problems and others and provides a tip assembly which is simple and inexpensive to manufacture and which has improved operating characteristics. These characteristics include faster printing speeds and greater ink dispensing capabilities as well as a more reliable overall tip assembly construction.

SUMMARY OF THE INVENTION

In accordance with the present invention, there is provided a tip assembly including a piezoelectric element having a passage extending longitudinally therethrough, an ink nozzle received in the passage and dimensioned such that a gap is defined therebetween, and an anchoring medium received in the gap for anchoring the nozzle within the passage. The nozzle is anchored to the piezoelectric element with a high modulus, electrically conductive, inorganic material. The energy transfer characteristics of the anchoring material between the nozzle and piezoelectric element permit the tip assembly to be operated at higher oscillating frequencies and with lower operating voltages.

In accordance with a preferred arrangement of the development, the anchoring material comprises a low melting temperature, metallic alloy. This melting point of the material is below the depolarization temperature of the piezoelectric element.

In accordance with a modified form of the present development a copper alloy ribbon is disposed in the gap between the piezoelectric element and nozzle which assists in completely filling the gap along with the anchoring material.

Also in accordance with the invention is provided a method of assembling the above ink jet tip assembly comprising the steps of coating the sidewall of the passage extending through the piezoelectric element with a low melting temperature metal alloy, coating at least a portion of the nozzle with a low temperature metal alloy, and inserting the nozzle to a position within the passage in the presence of sufficient heat to melt the alloys.

The principal object of the invention is the provision of a new and improved tip assembly and method for ink jet printers which can be easily manufactured to have improved operating characteristics.

The invention eliminates prior long term changes in tip assembly operating characteristics induced by the curing of epoxy and which quickly achieves maximum bonding for obtaining maximum energy transfer characteristics.

The present development also provides improved energy transfer characteristics in that the anchoring material expands slightly upon undergoing the transformation into a solid. This slight expansion causes a strong interconnection of the nozzle and the piezoelectric element so that actual adhesion of the anchoring material to these components is unnecessary.

Another advantage of the invention is in reducing the amount of labor necessary to make a tip assembly and in the elimination of the epoxy curing time.

The tip assemblies produced by the method of the present invention have been found to be more reliable and the very small percentage of assemblies which are unacceptable are easily salvaged.

The subject new method of manufacture facilitates easy detection of any defects such as hairline cracks, pinholes, or thin spots in the piezoelectric element.

Other objects and advantages of the subject development will become apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein.

DESCRIPTION OF A PREFERRED AND ALTERNATIVE EMBODIMENTS

Figure 1:
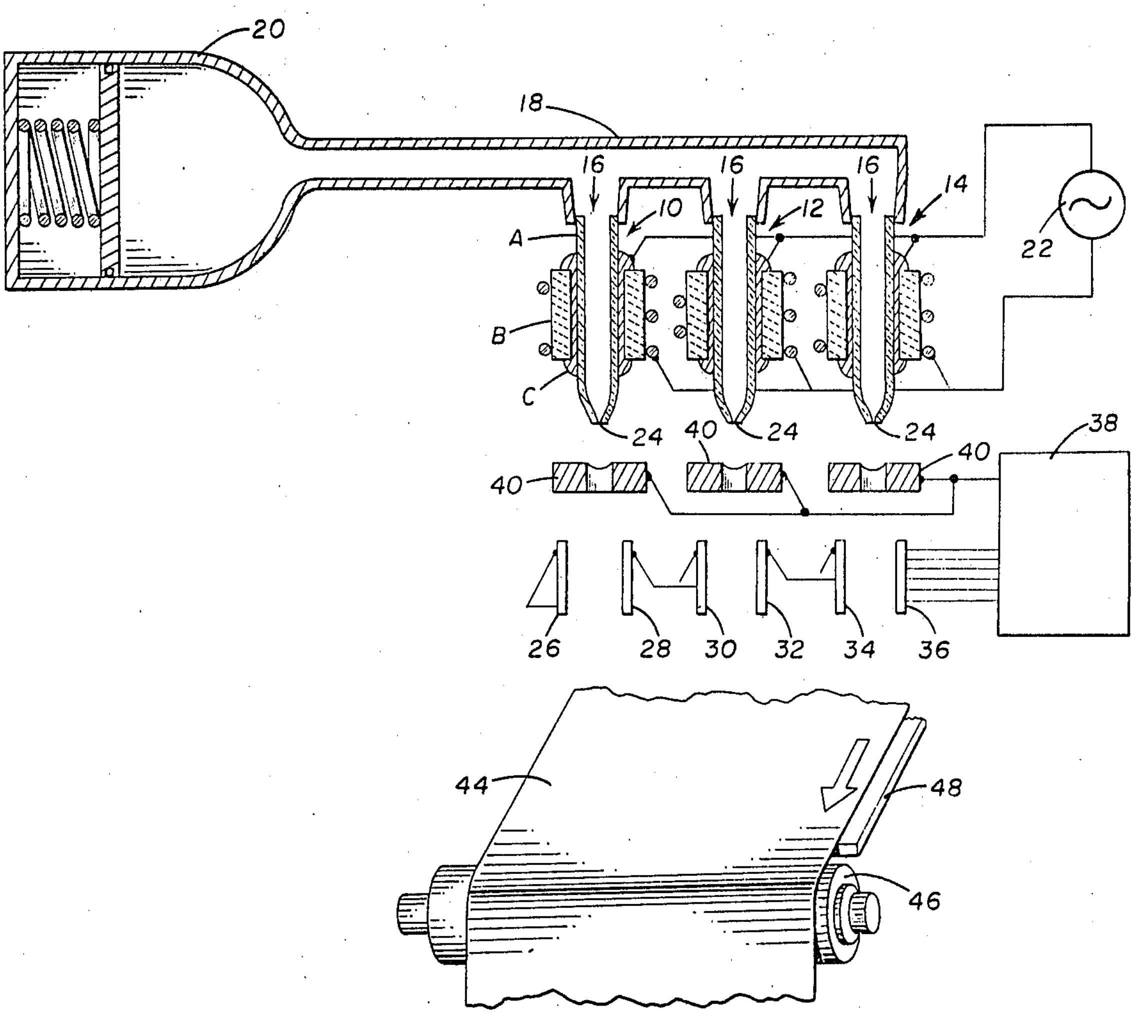
FIG. 1 shows plurality of ink jet tip assemblies constructed in accordance with the present invention and arranged in an ink jet printing environment.
Figure 2:
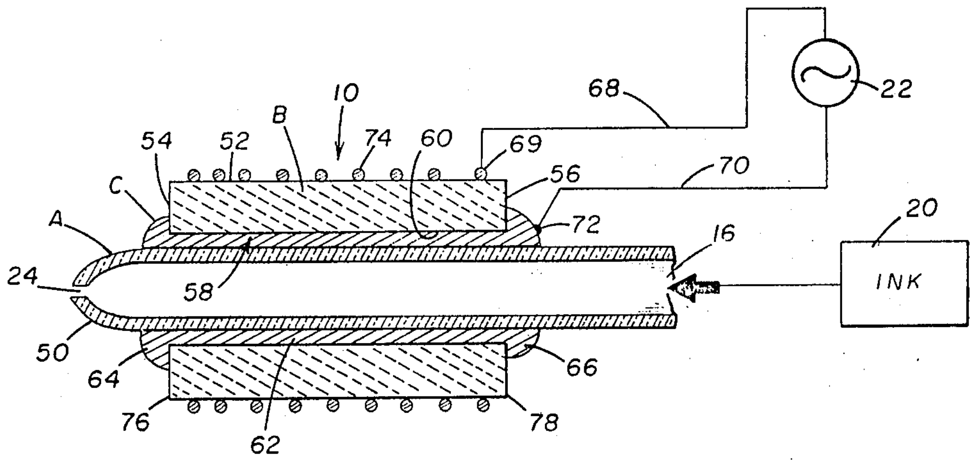
FIG. 2 is an enlarged view of one tip assembly shown in FIG. 1.

Referring now to the drawings wherein the showings are for the purposes of illustrating preferred embodiment of the invention only and not for purposes of limiting same, FIGS. 1 and 2 show ink jet tip assemblies each comprised of a glass ink nozzle A and a ceramic piezoelectric element B which are themselves operatively interconnected by anchoring medium C.

With particular reference to FIG. 1, therein generally illustrated is an ink jet printer assembly including an array of separate tip assemblies formed in accordance with the present invention. FIG. 1 is schematic in nature and provided for purposes of better appreciating the particular environment in which the subject invention is employed. The array includes three tip assemblies 10, 12 and 14 having their respective inlets 16 connected to an ink manifold generally designated 18. The ink manifold 18 is connected to an ink reservoir 20 which supplies ink under pressure to the manifold and thence to tip assemblies 10, 12 and 14. This pressure is large enough to quickly refill the assemblies with ink after each drop is ejected, but not large enough to force ink from the nozzle without assistance from the piezoelectric element.

An oscillating voltage source 22 applies an oscillating driving voltage across the inside and outside surfaces of piezoelectric element B. The voltage oscillations thus applied to the piezoelectric element cause it to expand and contract. Each contraction of the piezoelectric element causes a drop of ink approximately 2.5 mils in diameter to be pumped from an outlet orifice 24 of each nozzle A. The droplets ejected from each orifice pass between a pair of capacitive-like parallel plates 26–28, 30–32 and 34–36, respectively. A deflection control circuit 38 charges the ink droplets with charging rings 40 connected to charging line 42. The control circuit also applies charges to the parallel plates to controllably deflect the ink drops as they pass therebetween.

After passing between the parallel plates, the droplets strike a sheet of paper 44 which is fed by a paper feed 46 across a paper carrying surface 48. The motion of the paper and the deflection of the droplets by the parallel plates cause the droplets to land in controlled patterns which form letters or other characters. The feed direction of the paper is often parallel to the parallel plates. Again, the overall construction and operation of such ink jet printers are known in the art. Since the specific details of the printer itself do not form a part of the present invention, it has not been shown or described in greater detail herein.

FIG. 2 shows an enlarged cross-sectional view of tip assembly 10 in much greater detail. The assembly has a conventional ink nozzle A with one end 50 tapered to form an outlet area which includes outlet orifice 24 and the other end or inlet 16 adapted to receive ink from the ink manifold 18 as outlined above. U.S. Pat. No. 3,393,988 describes a suitable glass nozzle for use in the present invention, although nozzles of other materials may be used.

Figure 4:
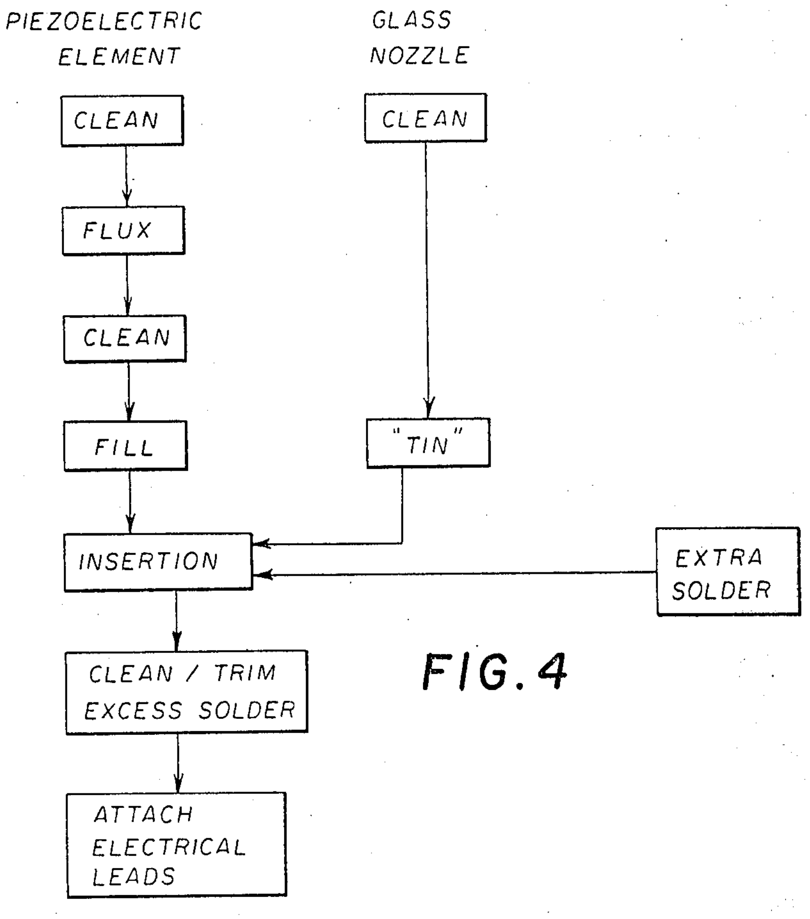
FIG. 4 is a block diagram of assembly steps for assembling of ink jet tip assembly in accordance with the method of the present invention.

The piezoelectric element B and ink nozzle A may be similar to those corresponding elements as shown in FIG. 4 of U.S. Pat. Nos. 3,683,212 and 3,832,579. While the piezoelectric element shown in FIG. 2 herein is cylindrical and surrounds a cylindrical ink nozzle, it will be understood that other shapes may also be advantageously used. The piezoelectric element has an outer wall or surface 52 extending between opposed end faces 54, 56. A through bore or passage 58 extends longitudinally through the element between the end faces and has passage side wall 60.

By way of reference, a conventional piezoelectric element B has a length of approximately ½" between end faces 54, 56 and a diameter generally in the range of 1/16" to ⅛". A conventional glass ink nozzle B has a length greater than the associated piezoelectric element to accommodate mounting to an ink supply in an ink jet printer. The gap area between passage side wall 60 and the outer surface of the nozzle is generally in the range of 1–1½ mil.

The anchoring medium C is comprised of a high modulus electrically conductive inorganic substance such as the low melting temperature solder or metal alloy. This substance fills the thin gap between the outer surface of nozzle B and side wall 60 of passage 58. This gap has been exaggerated in the drawings for ease of illustration. The substance fills the gap with a thin film 62 and beads slightly at the orifice end as at 64 and the ink receiving end as at 66. The bonding or anchoring medium performs two functions, that is, it transfers vibratory energy from the piezoelectric element to the ink nozzle and it also provides an electrical connection to one surface of the piezoelectric element for applying a driving voltage thereto.

The source of oscillating voltage 22 is connected to the piezoelectric element outer surface 52 and to the inner surface as defined by passage side wall 60 by leads 68, 70. The connection to the inner surface is accomplished by connecting lead 70 to the low temperature alloy as at area 72. The connection to the outer surface is accomplished by connecting lead 68 to a coil 74 which is closely wrapped about element outer wall 52.

In the prior art tip assemblies using epoxy resin, the corner areas 76, 78 defined by the intersection of the piezoelectric element outer wall and end faces were rounded to prevent arcing and shorting of the piezoelectric element. This rounding is unnecessary in the present invention, but care must be taken that beads 64, 66 are not so large that they connect the inside and outside surfaces of the piezoelectric element shorting the piezoelectric element.

The anchoring medium C desirably comprises a stiff, high modulus substance with good electrical conductivity. An anchoring material which melts below the depolarization temperature of the piezoelectric element is preferred and in the preferred embodiment, this temperature is approximately 300° F. Heating the piezoelectric element above this temperature may necessitate repolarization of the element. Further, in order to insure good mechanical bonding and transmission of vibrations between the piezoelectic element and the nozzle, an anchoring substance which does not shrink and which preferably expands at least slightly upon setting up is desirable. Additionally, the anchoring medium functions as an electrical conductor so it must either be made of an electrically conductive material or have an electrically conductive element be added thereto. A material with good oscillating energy transfer characteristics is also desired in order that the medium will perform the two operative functions noted hereinabove.

An ideal anchoring medium has been found to be low melting temperature metal alloys. One such low temperature alloy found especially suitable is #158 Low Temperature Solder manufactured by Arconium Corporation of America located in Providence, R.I. This low temperature alloy also known as Lipowitz alloy has the composition listed in Table II for the 158° F. alloy. Other low temperature alloys which may be used include Wood's metal and the Cerro Corporation solders listed in Table I below.

TABLE I

| Solder | Melting Point °F. | |
|---|---|---|
| Cerrolow-117 | 117 | |
| Cerrolow-136 | 136 | Eutectic |
| Cerrobend | 158 | Eutectic |
| Cerrobase | 255 | Eutectic |
| Cerrotru | 281 | Eutectic |
| Cerro Specials | Var. | Eutectic |
| Cerrolow-147 | 142–149 | Non-eutectic |
| Cerrosafe | 158–190 | Non-eutectic |
| Cerromatrix | 217–440 | Non-eutectic |
| Cerrocast | 281–338 | Non-eutectic |
| Cerro Specials | Var. | Non-eutectic |

These low melting temperature alloys are generally an alloy of two or more of the metals bismuth, lead, tin, cadmium, indium, zinc, silver or antimony. Specific alloy combinations are listed in Tables II and III below.

TABLE II

| Melting temperature | | Composition eutectic alloys | | | | |
|---|---|---|---|---|---|---|
| °F. | °C. | Bi | Pb | Sn | Cd | Other |
| 117 | 46.8 | 44.70 | 22.60 | 8.30 | 5.30 | 19.10 In |
| 136 | 58 | 49.00 | 18.00 | 12.00 | 21.00 | In |
| | | | | — | | |
| 158 | 70 | 50.00 | 26.70 | 13.30 | 10.00 | — |
| 197 | 91.5 | 51.60 | 40.20 | — | 8.20 | — |
| 203 | 95 | 52.50 | 32.00 | 15.50 | — | — |
| 217 | 102.5 | 54.00 | — | 26.00 | 20.00 | — |
| 255 | 124 | 55.50 | 44.50 | — | — | — |
| 281 | 138.5 | 58.00 | — | 42.00 | — | — |
| 288 | 142 | — | 30.60 | 51.20 | 18.20 | — |
| 291 | 144 | 60.00 | — | — | 40.00 | — |
| 351 | 177 | — | — | 67.75 | 32.25 | — |
| 362 | 183 | — | 38.14 | 61.86 | — | — |
| 390 | 199 | — | — | 91.00 | — | 9.00 Zn |
| 430 | 221.3 | — | — | 96.50 | — | 3.50 Ag |
| 457 | 236 | — | 79.70 | — | 17.70 | 2.60 Sb |
| 477 | 247 | — | 87.00 | — | — | 13.00 Sb |

TABLE III

| Yield Temp. | | Melting Temp. | noneutectic alloys | | | | |
|---|---|---|---|---|---|---|---|
| F. | C. | range, F. | Bi | Pb | Sn | Cd | Other |
| 159 | 70.5 | 158 to 163 | 50.50 | 27.8 | 12.40 | 9.30 | — |
| 162 | 72.0 | 158 to 174 | 50.00 | 34.5 | 9.30 | 6.20 | — |
| 163 | 72.5 | 158 to 183 | 50.72 | 30.91 | 14.97 | 3.40 | — |
| 163 | 72.5 | 158 to 194 | 42.50 | 37.70 | 11.30 | 8.50 | — |
| 167 | 75 | 158 to 214 | 35.10 | 36.40 | 19.06 | 9.44 | — |
| 205 | 96 | 203 to 219 | 56.00 | 22.00 | 22.00 | — | — |
| 205 | 96 | 203 to 300 | 67.00 | 16.00 | 17.00 | — | — |
| 214 | 111 | 203 to 289 | 33.33 | 33.34 | 33.33 | — | — |
| 241 | 116 | 217 to 440 | 48.00 | 28.50 | 14.50 | — | 9.00 Sb |
| 302 | 138.5 | 281 to 338 | 40.00 | — | 60.00 | — | — |

Tip assemblies of the above described design have been operated successfully at frequencies in excess of 10 Kilohertz and in the 18 to 40 volt range. It appears that the low temperature solders which solidify to form a crystalline rather than amorphous structures, tend to conduct vibratory energy more efficiently. However, both are superior to the prior art epoxy bond.

Figure 3:
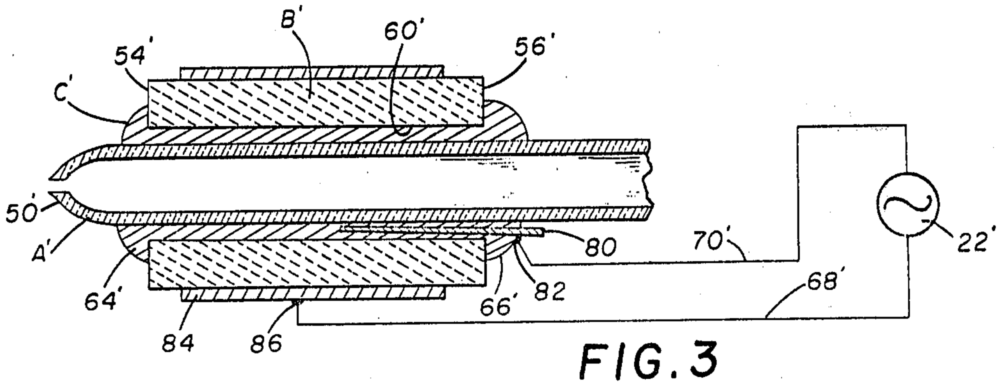
FIG. 3 shows an alternate embodiment of an ink jet tip assembly constructed in accordance with the present invention.

FIG. 3 shows an alternate embodiment of the ink jet tip assembly of FIG. 2. For ease of illustration and description, like components are identified by like components with a primed (′) suffix and new components are identified by new numerals. One modification included in this alternate embodiment is the insertion of a brass or other copper alloy ribbon 80 within the gap defined between the outer surface of nozzle A and the inner surface of piezoelectric element B as defined by passage side wall 60′. This ribbon is encased in the anchoring medium C and extends approximately half or more the length of the piezoelectric element between end faces 54′, 56′. Element 80, being a good electrical conductor, acts to insure that the electrical potential is evenly applied along inner surface 60′ of the piezoelectric element. In this embodiment, the electrical contact to voltage source 22′ is made to or adjacent to strip 80 as at 82 by lead 70′.

A second modification shown in FIG. 3 is the use of an electrically conductive sheath or cylinder 84 which closely surrounds piezoelectric element outer surface 52′. Lead 68′ is connected to sheath 84 as at 86. This electrically conductive sheath insures that electrical potential will be applied uniformly across the outer surface during operation.

Description will hereinafter be made with reference to FIG. 4 which shows a block diagram of the overall method employed for realizing the tip assembly of the present invention. The components themselves are first collected and thoroughly cleaned. Conventional cleaners, such as State Chemical 999 cleaning solvent or the equivalent, may be used for this step. After cleansing in the solvent, the parts are rinsed in distilled water and air blown dry.

Following cleaning, the surface of the bore or passage 58 in the piezoelectric element is wetted with a conventional flux such as Superior #23 Flux manufactured by Superior Flux & Mfg. Co. of Cleveland, Ohio. The flux must be suitable for the temperature at which the selected alloy in the anchoring medium melts. Care should be taken to limit the contact of the flux to inner surface 60 of the piezoelectric element. Should flux be applied to the outer surface 52, the solder may flow around the element and electrically connect surfaces 52, 60 to cause an electrical short. If an acid flux is used, then all excess flux should be removed to eliminate a possible source of corrosion. All flux should be removed from the exterior surface of the piezoelectric element and the element dried.

If copper alloy strip 80 of the FIG. 3 alternative embodiment is to be used, the same cleaning and fluxing steps described above are carried out with respect to the strip.

Figure 5:
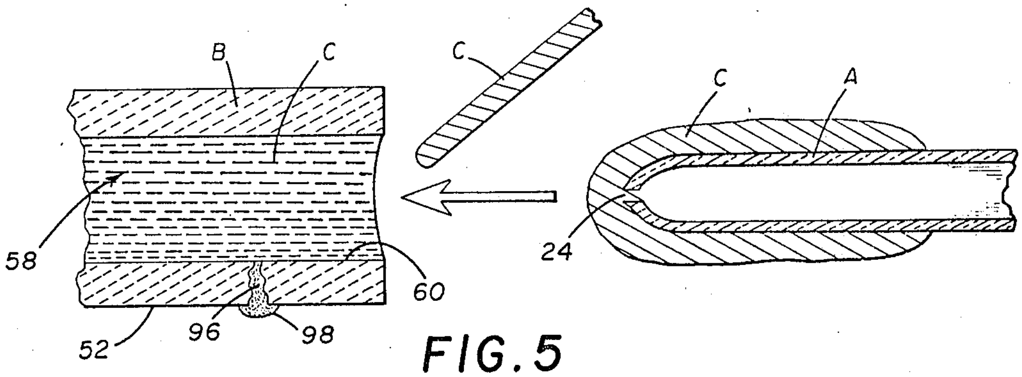
FIG. 5 is a diagrammatic representation of the assembly of parts of an ink jet tip assembly in accordance with the method of the present invention.

Referring to both FIGS. 4 and 5, passage 58 in the piezoelectric element B is filled with the low melting temperature alloy. Filling passage 58 is not strictly necessary, but coating the inner surface 60 of such a small passage usually results in filling the passage. In the preferred embodiment, a syringe is used to draw molten solder into the passage. Immersion, injection or other methods of filling or coating the surface of the passage may be used.

Similarly, the copper alloy strip 80, if used, is dipped into the molten solder to "tin" or coat at least that portion of it which will be inserted in the gap between the nozzle and the piezoelectric element.

The nozzle A, having been cleaned as indicated above, is dipped into the low melting temperature alloy from outlet area 50 to a depth such that the entire length which is to be inserted into the piezoelectric element is coated on the exterior surface with the alloy. The surface tension of the molten alloy and the small size of outlet orifice 24 combine to block the alloy from entering the interior of the nozzle. The "tinned" surfaces of the nozzle and the brass ribbon should be inspected to be sure the surfaces are smooth. Irregularities in the "tinned" surface normally indicate foreign matter within the alloy or abnormalities on the surface of the coated part.

In the insertion step, the piezoelectric element B, nozzle A and, if used, brass strip 80 are warmed to a temperature at which the alloy melts so that it is in a liquid state. The insertion step is shown diagrammatically in FIG. 5. In the insertion step, the nozzle which is coated or wetted with the melted alloy and the brass ribbon (if used) which is also coated with the melted alloy are inserted into the alloy filled interior of piezoelectric element B. Further, additional alloy 90 may be present to insure that adequate alloy is present for a complete filling of the gap between piezoelectric element B and the nozzle A. The presence of this extra alloy and the warming can be carried out simultaneously by submerging the parts within a bath of the molten alloy and performing the insertion step in a liquid alloy bath. When the bath of molten alloy is used, the separate step of tinning or coating the parts may be eliminated because such coating occurs automatically as the parts are placed in the bath.

Upon assembling the elements, they are removed from the heat source and the liquid molten alloy allowed to solidify. Any excess alloy obstructing the orifice 24 of the glass nozzle may be removed either with a razor blade or by touching a warm soldering iron to the obstructive alloy. Because the alloys do not adhere well to glass, they will bead back forming the bead 64 (FIG. 2) clearing the tip from the obstructive coating. Further, any excess alloy at the rear of the cylinder may be beaded as at 66 with a soldering iron and the excess discarded.

The electrical leads 68, 70 of FIG. 2 are conveniently connected with a low temperature alloy to the piezoelectric element at area 72 and the end of coil 74 adjacent end face 56. In FIG. 3 leads 68', 70' are similarly connected to sleeve 84 and ribbon 80 as at areas 86, 82, respectively. Other lead mounting arrangements could also be used if desired without departing from the intent and scope of the present invention.

As a part of the step of filling passage 58 in the piezoelectric element or any step subsequent thereto, an inspection may be made for cracks, holes or thin spots in the piezoelectric element side wall. If there is a crack or hole such as that designated 96 in FIG. 5, the flux will wet through the hole and wet a small area on outer surface 52. Then, upon filling the passage with solder in a manner described hereinabove, a small dot or line of solder as at 98 will appear at outer surface 52 to thus mark the crack or hole. If a mark of alloy of this nature is spotted, the piezoelectric element is discarded as cracked or defective. Further, if the piezoelectric element has a thin spot, the slight expansion of the alloy on cooling causes a bulge or crack to appear in the element side wall. Since cooling need not occur until after the insertion step, an inspection for this type of defect is frequently carried out subsequent to insertion of the glass nozzle into the piezoelectric element.

The tip may now be tested electronically to ascertain the frequency range over which it operates and the voltage which is necessary to drive it. If the voltage is excessive or the frequency range over which it may be driven minimal, a probable cause of the defect is an air bubble, impurity, or other imperfection in anchoring medium C between the nozzle and the piezoelectric element. This defect may be cured by warming the combined assembly and uninserting or removing nozzle A from piezoelectric element B. Subsequent reinsertion of the nozzle into the element in the presence of additional alloy may be sufficient to correct the defect.

Tip assemblies made in accordance with the above method will normally operate at frequencies above 6 kilohertz and may operate at 10 kilohertz and above. Normal minimum drive voltages are in the range of 18 to 40 volts. However, voltages on the order of 100 volts are commonly used in existing ink jet printers.

The preferred and alternative embodiments described above are set forth by way of example only and are not intended to limit the scope of the invention beyond the scope of the appended claims or the equivalents thereof.

I claim:

1. A method of assembling an ink jet tip assembly comprised of a piezoelectric element having a through passage with an ink nozzle received therein and dimensioned such that a gap is defined between the side wall of said passage and said nozzle, said method comprising the steps of:

(a) coating the side wall of said piezoelectric element passage with a first metallic alloy;

(b) coating at least a longitudinal portion of said nozzle with a second metallic alloy;

(c) heating said first and second alloys to at least their melting temperatures;

(d) inserting at least a portion of said nozzle to a desired oriented position within said nozzle in said passage; and (e) allowing said first and second alloys to cool to their solid phase for fixedly joining said piezoelectric element and nozzle together.

2. The method as set forth in claim 1 further including the step of applying flux to said passage side wall prior to said step of coating it with a first metallic alloy.

3. The method set forth in claim 1 further including the step of inspecting said piezoelectric element for the presence of said first metallic alloy at areas thereon other than said passage side wall following the step of coating said passage side wall.

4. The method as set forth in claim 1 wherein the step of coating said passage side wall further comprises the step of drawing said first metallic alloy in a liquid state into said passage.

5. The method as set forth in claim 1 wherein said ink nozzle has an orifice at one end through which droplets of ink are adapted to be ejected and wherein the method further includes the step of cleaning metallic alloy from said orifice.

6. The method as set forth in claim 5 wherein the step of cleaning metallic alloy from said orifice includes heating metallic alloy adjacent to said orifice in such a manner as to cause the alloy to bead away from said orifice.

7. The method as set forth in claim 5 wherein the step of cleaning metallic alloy from said orifice includes mechanically scraping the alloy from adjacent said orifice.

8. The method as set forth in claim 1 further including inserting a metallic ribbon in said gap as said nozzle is inserted within said passage.

9. The method as set forth in claim 1 wherein said first alloy and second alloy are low temperature solders each having a melting temperature below the depolarization temperature of the piezoelectric element.

10. The method of testing a piezoelectric element having an outer wall and having a side wall defining a passage therethrough for cracks or holes comprising:

applying flux to said side wall, whereby the flux coats the side wall and flows through any cracks or holes to the outer wall wetting a small area of the outer wall around the crack or hole;

applying a molten metallic alloy to said piezoelectric element whereby the metallic alloy coats said side wall and any areas on the outer wall wetted by the flux; and inspecting said outer wall for metallic alloy.

* * * * *

UNITED STATES PATENT AND TRADEMARK OFFICE

CERTIFICATE OF CORRECTION

PATENT NO. : 4,426,031

DATED : January 17, 1984

INVENTOR(S) : Laszlo Halasz

It is certified that error appears in the above-identified patent and that said Letters Patent are hereby corrected as shown below:

In column 6, Table II, Line 2, please change "21.00" to -- ——— --; and

In column 6, Table II, Line 2, please change "IN" to -- 21.00IN --.

Signed and Sealed this

*First* Day of *May 1984*

[SEAL]

*Attest:*

GERALD J. MOSSINGHOFF

*Attesting Officer* *Commissioner of Patents and Trademarks*